US011863710B2

(12) United States Patent
Lei et al.

(10) Patent No.: US 11,863,710 B2
(45) Date of Patent: Jan. 2, 2024

(54) AUDIO DEVICE AND METHOD FOR DETECTING DEVICE STATUS OF AUDIO DEVICE IN AUDIO/VIDEO CONFERENCE

(71) Applicant: MEDIATEK INC., Hsinchu (TW)

(72) Inventors: Shaw-Min Lei, San Jose, CA (US); Yiou-Wen Cheng, Hsinchu (TW); Liang-Che Sun, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 236 days.

(21) Appl. No.: 17/515,909

(22) Filed: Nov. 1, 2021

(65) Prior Publication Data

US 2023/0133061 A1    May 4, 2023

(51) Int. Cl.
*H04M 9/08* (2006.01)
*G10K 11/178* (2006.01)

(52) U.S. Cl.
CPC ....... *H04M 9/082* (2013.01); *G10K 11/17854* (2018.01); *G10K 11/17881* (2018.01); *H04M 9/085* (2013.01)

(58) Field of Classification Search
CPC  H04M 9/082; H04M 9/085; G10K 11/17881; G10K 11/17854
See application file for complete search history.

(56) References Cited

U.S. PATENT DOCUMENTS

| | | | | |
|---|---|---|---|---|
| 7,003,099 B1 * | 2/2006 | Zhang | .................. | H04M 9/082 379/406.05 |
| 7,672,445 B1 * | 3/2010 | Zhang | .................. | H04M 9/082 379/406.01 |
| 8,085,947 B2 | 12/2011 | Haulick et al. | | |
| 9,916,840 B1 | 3/2018 | Do et al. | | |
| 9,967,661 B1 | 5/2018 | Hilmes et al. | | |
| 10,636,435 B1 * | 4/2020 | Doyle | ...................... | H04R 3/04 |
| 10,650,840 B1 * | 5/2020 | Solbach | .............. | G10L 21/0224 |
| 10,937,441 B1 * | 3/2021 | Kristjansson | ....... | G10L 21/0264 |
| 10,979,100 B2 | 4/2021 | Christoph | | |
| 11,044,368 B2 | 6/2021 | Kim | | |

(Continued)

FOREIGN PATENT DOCUMENTS

| | | |
|---|---|---|
| CN | 104778950 B | 3/2018 |
| CN | 110310654 A | 10/2019 |

(Continued)

OTHER PUBLICATIONS

Chinese language office action dated Nov. 8, 2022, issued in application No. TW 110144096.

*Primary Examiner* — Simon King
(74) *Attorney, Agent, or Firm* — McClure, Qualey & Rodack, LLP

(57) ABSTRACT

An audio device is provided. The audio device includes processing circuitry which is connected to a loudspeaker and a microphone. The processing circuitry is configured to play an echo reference signal from a far end on the loudspeaker, and perform an acoustic echo cancellation (AEC) process using the echo reference signal and an acoustic signal received by the microphone using an AEC adaptive filter. The processing circuitry repeatedly determines a first status of the loudspeaker according to a relation between the played echo reference signal and the received acoustic signal, and transmits a first status signal indicating the first status of the loudspeaker to the far end through a cloud network.

16 Claims, 6 Drawing Sheets

(56) References Cited

U.S. PATENT DOCUMENTS

| | | | | |
|---|---|---|---|---|
| 11,404,073 B1* | 8/2022 | Zhang | ................. | G10L 21/0216 |
| 11,451,905 B1* | 9/2022 | Shaw | ................... | H04M 9/082 |
| 11,538,451 B2 | 12/2022 | Sereshki et al. | | |
| 11,552,611 B2* | 1/2023 | Veselinovic | ............ | H04M 9/08 |
| 2019/0066654 A1* | 2/2019 | Dickins | ............ | G10K 11/17853 |
| 2022/0053268 A1* | 2/2022 | Yun | ....................... | H04M 9/082 |
| 2022/0310106 A1* | 9/2022 | Nguyen | ................. | G10K 11/04 |
| 2023/0171346 A1* | 6/2023 | Kuthuru | ................. | H04M 9/08 |
| | | | | 379/406.08 |

FOREIGN PATENT DOCUMENTS

| | | |
|---|---|---|
| CN | 111128210 A | 5/2020 |
| CN | 111418011 A | 7/2020 |
| CN | 111640449 A | 9/2020 |
| JP | 5288723 B2 | 9/2013 |
| TW | 201933335 A | 8/2019 |

* cited by examiner

AUDIO DEVICE AND METHOD FOR DETECTING DEVICE STATUS OF AUDIO DEVICE IN AUDIO/VIDEO CONFERENCE

BACKGROUND OF THE INVENTION

Field of the Invention

The invention relates to video conferences, and, in particular, to an audio device and a method for detecting device status of an audio device in an audio/video conference.

Description of the Related Art

The questions "did you hear me?" and "what did you say?" are asked frequently in audio/video conferences because a speaker needs to know whether the other participants are online and capable of hearing the sound from their speakers. However, it is frustrating for the speaker to constantly ask these questions in an audio/video conference.

Therefore, there is demand for a video-conferencing audio device and a method for detecting device status in an audio/video conference to solve the aforementioned issue.

BRIEF SUMMARY OF THE INVENTION

A detailed description is given in the following embodiments with reference to the accompanying drawings.

In an exemplary embodiment, an audio device is provided. The audio device includes processing circuitry which is connected to a loudspeaker and a microphone. The processing circuitry is configured to play an echo reference signal from a far end on the loudspeaker, and perform an acoustic echo cancellation (AEC) process using the echo reference signal and an acoustic signal received by the microphone using an AEC adaptive filter. The processing circuitry repeatedly determines a first status of the loudspeaker according to a relation between the played echo reference signal and the received acoustic signal, and transmits a first status signal indicating the first status of the loudspeaker to the far end through a cloud network.

In some embodiments, in response to the processing circuitry determining that a signal level of the microphone is lower than or equal to a threshold, the processing circuitry determines the microphone being muted. In response to the processing circuitry determining that the signal level of the microphone is higher than the threshold, the processing circuitry determines a second status of the microphone being working normally, sends a second status signal indicating the second status of the microphone to the far end through the cloud network, obtains the filter coefficients from the AEC adaptive filter, and calculates similarity between the obtained filter coefficients and the reference filter coefficients.

In some embodiments, in response to the processing circuitry determining that the calculated similarity is lower than a preset threshold, the processing circuitry determines that the first status of the loudspeaker is that it is not working. In response to the processing circuitry determining that the calculated similarity is higher than or equal to the preset threshold, the processing circuitry determines that the first status of the loudspeaker is that the loudspeaker is working normally.

In some embodiments, the reference filter coefficients are calculated using the AEC adaptive filter by playing white noise and sweeping tones on the loudspeaker for a first predetermined period of time, and the calculated reference filter coefficients are pre-stored in a nonvolatile memory of the audio device during a process of manufacturing the audio device in a factory.

In some embodiments, the processing circuitry initializes the filter coefficients of the AEC adaptive filter to zero, and obtains the filter coefficients from the AEC adaptive filter at runtime as the reference filter coefficients by calculating an average of the filter coefficients of the AEC adaptive filter within a second predetermined period of time.

In some embodiments, the processing circuitry calculates cosine similarity between the filter coefficients and the reference filter coefficients as the similarity.

In some embodiments, the processing circuitry receives a third status signal and a fourth status signal respectively indicating a third status of a loudspeaker of another audio device and a fourth status of a microphone of the another audio device at the far end through the cloud network, and displays icons corresponding to the third status and the fourth status on a graphical user interface of a video-conferencing application running on a video device in which the audio device is disposed.

In another exemplary embodiment, a method for use in an audio device is provided. The audio device is connected to a loudspeaker and a microphone. The method includes the following steps: playing an echo reference signal from a far end on the loudspeaker; performing an acoustic echo cancellation (AEC) process on the echo reference signal and an acoustic signal received by the microphone using an AEC adaptive filter; determining a first status of the loudspeaker according to a relation between the played echo reference signal and the received acoustic signal; and transmitting a first status signal indicating the first status of the loudspeaker to the far end through a cloud network.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
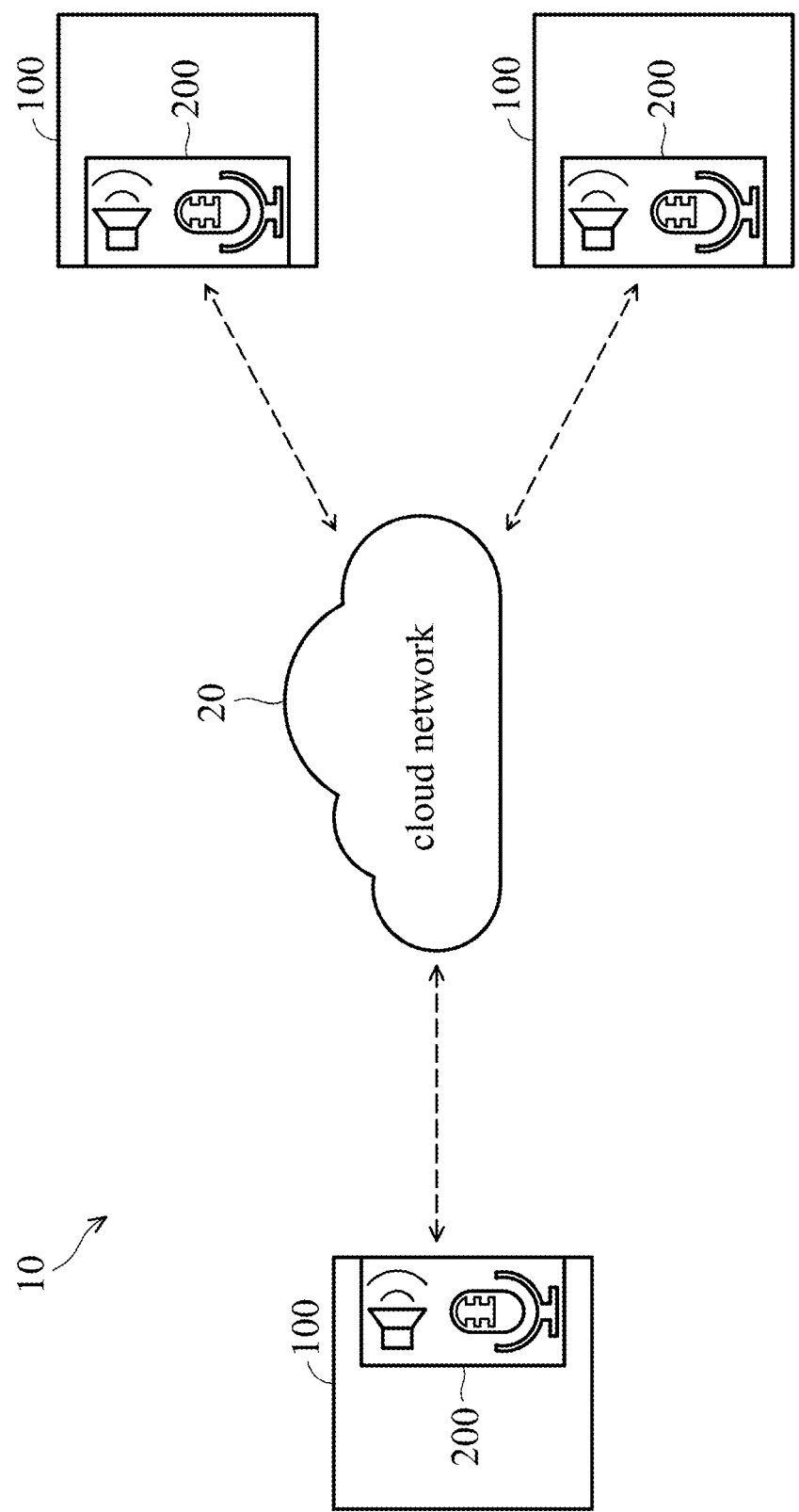
FIG. 1 is a block diagram of a video-conferencing system in accordance with an embodiment of the invention.

FIG. 1 is a block diagram of a video-conferencing system in accordance with an embodiment of the invention.

In an embodiment, the video-conferencing system 10 that may include two or more video-conferencing apparatuses 100 connecting to each other through a cloud network 20. Each video device 100 may be an electronic device that include a display function, a web-camera function, a loudspeaker function, and a microphone function, such as a desktop computer equipped with a loudspeaker and a microphone, a laptop computer, a smartphone, or a tablet PC, but the invention is not limited thereto. In some embodiments, the loudspeaker function and microphone function in each video device 100 may be implemented by an audio device 200.

In some embodiments, each video device 100 may execute a video-conferencing application that renders a graphical user interface on its display. The user of each video device 100 can see the device status (e.g., including the statuses of the microphone and loudspeaker) of the audio device 200 of other participants in the video conference via the graphical user interface.

The audio device 200 may include an acoustic echo cancellation (AEC) function so as to provide high-quality acoustic signal for everyone in the audio/video conference. In some embodiments, the audio device 200 may be an electronic device that handles both the loudspeaker and microphone functions, such as a desktop audio device, a tabletop audio device, a soundbar with a microphone array, a smartphone, a tablet PC, a laptop computer, or a personal computer equipped with a standalone microphone (e.g., may be a microphone with a 3.5 mm jack, a USB microphone, or a Bluetooth microphone) and a standalone loudspeaker, but the invention is not limited thereto. In some embodiments, the audio device 200 may be disposed in the video device 100. In some other embodiments, the audio device 200 is electrically connected to the video device 100, and the audio device 200 and video device 100 are standalone devices.

Figure 2:
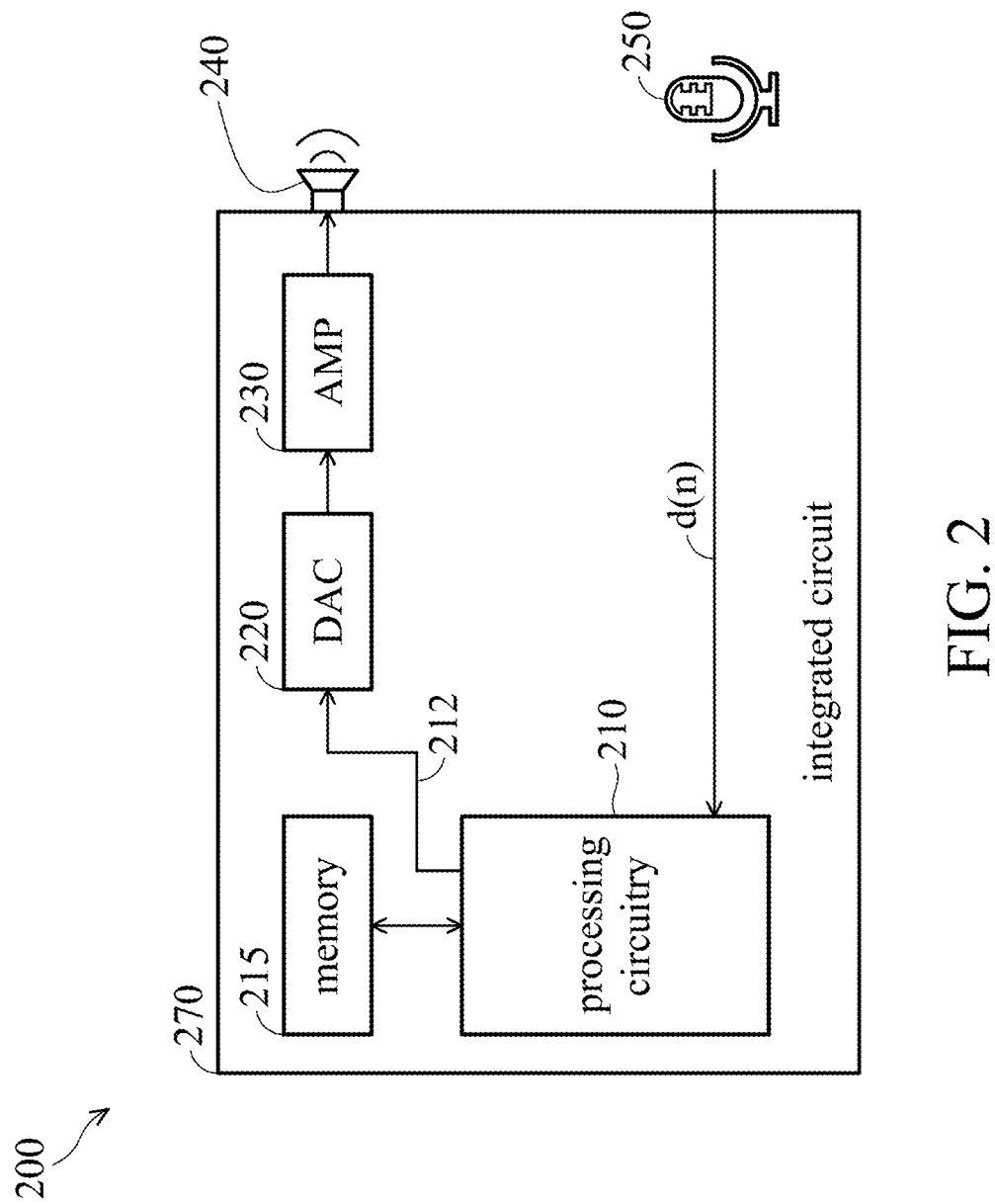
FIG. 2 is a block diagram of the audio device in accordance with an embodiment of the invention.

FIG. 2 is a block diagram of the audio device 200 in accordance with an embodiment of the invention.

In an embodiment, the audio device 200 may include processing circuitry 210, a memory 215, digital-to-analog converter (DAC) 220, an amplifier (AMP) 230, one or more loudspeakers 240, and one or more microphones 250. The processing circuitry 210, buffer memory 215, DAC 220, and amplifier 230 may be implemented by an integrated circuit (or system-on-chip) 270. The processing circuitry 210 may be implemented by a central processing unit (CPU), a digital-signal processor (DSP), or an application-specific integrated circuit (ASIC), multiple processors and/or a processor having multiple cores, but the invention is not limited thereto. The memory 215 may be a type of computer storage media and may include volatile memory and non-volatile memory. The memory 215 may include, but is not limited to, random access memory (RAM), read-only memory (ROM), electrically erasable programmable read-only memory (EEPROM), flash memory, or other memory technology.

The loudspeaker 240 may be configured to emit a speaker signal from other audio device 200 in the video-conferencing system 10. In addition, the loudspeaker 240 may also emit an echo reference signal 212, and the microphone 250 may receive a local speech signal and other sounds from the user environment in addition to the echo reference signal. In some embodiments, the microphone 250 may include an analog-to-digital converter (ADC) (not shown in FIG. 2) to convert the received analog acoustic signal into a discrete acoustic signal for subsequent AEC processing.

The processing circuitry 210 may perform an AEC process on the acoustic signal (i.e., including the echo reference signal, local speech signal, and other environment sounds) received by the microphone 250 so as to estimate the status of the echo path from the loudspeaker 240 to the microphone 250. In some embodiments, the AEC process may be implemented by an AEC adaptive filter such as an LMS (least mean squares) filter, an NLMS (normalized least mean squares) adaptive filter, or an adaptive filter of other types with a predetermined number of taps, but the invention is not limited thereto.

Specifically, when the user joins a video conference or an audio conference using the audio device 200, the positions of the loudspeaker 240 and microphone 250 are generally fixed, and the distance between the loudspeaker 240 and microphone 250 are also fixed. When the loudspeaker 240 and microphone 250 are working normally, it indicates that the echo path from the loudspeaker 240 to the microphone 250 is valid, the coefficients of the AEC adaptive filter will converge, and they will be close to predefined coefficients. When the loudspeaker 240 or the microphone 250 is turned off or does not work normally, the coefficients of the AEC adaptive filter will diverge. The details of the AEC process will be described in the following section.

Figure 3:
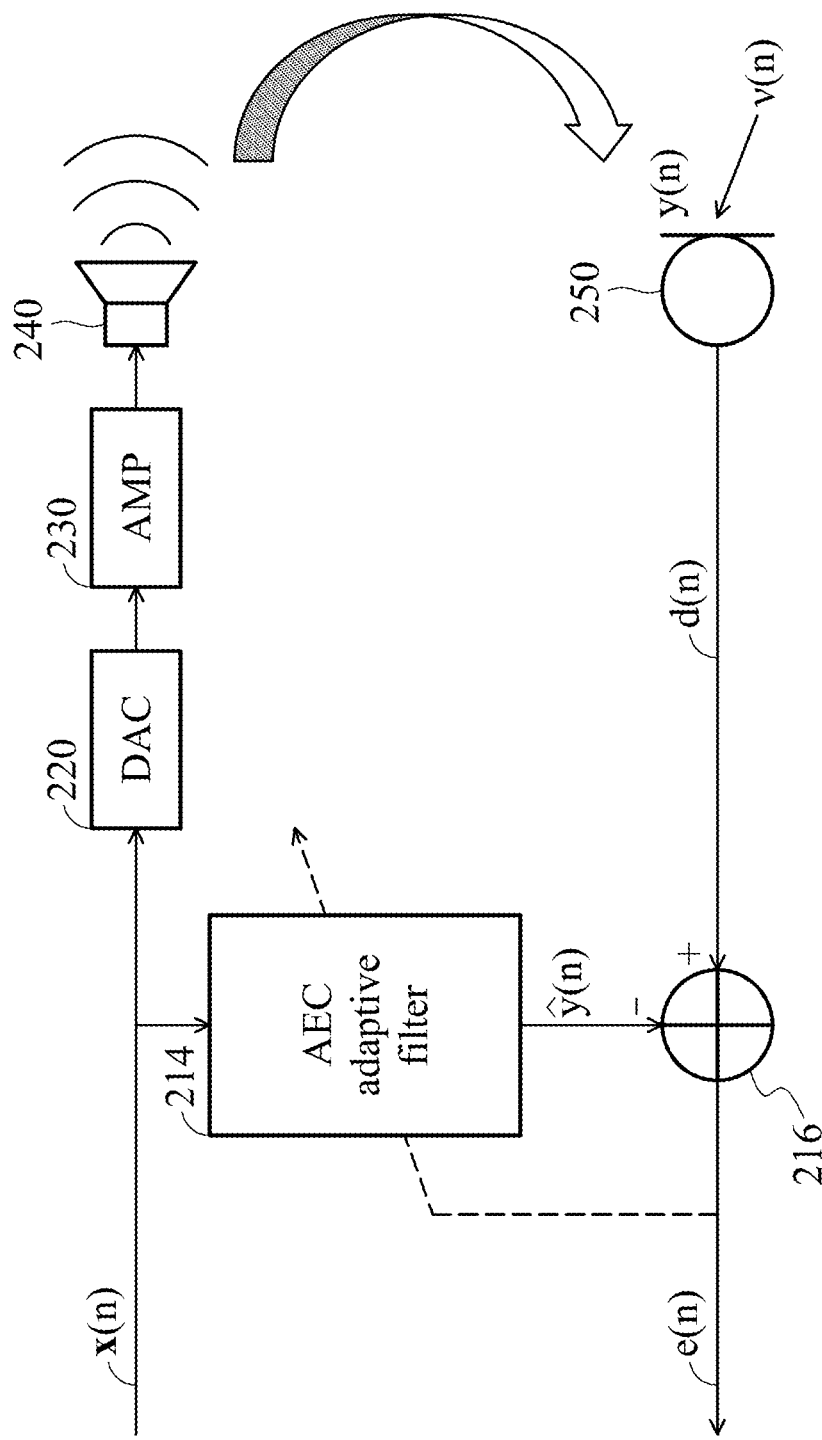
FIG. 3 is a diagram of the flow of an acoustic echo cancellation (AEC) process in accordance with an embodiment of the invention.

FIG. 3 is a diagram of the flow of an acoustic echo cancellation (AEC) process in accordance with an embodiment of the invention.

Referring to FIG. 3, the processing circuitry 210 may store a predetermined number of input samples from the far end (e.g., other audio device 200 in the video-conferencing system 10) in the memory 215, where the predetermined number of input samples may be equal to the number of taps of the AEC adaptive filter 214.

For ease of description, the NLMS (normalized least mean square) algorithm is used in the AEC adaptive filter 214 of the processing circuitry 210, and the AEC adaptive filter 214 may find the filter coefficients that relate to producing the least normalized mean square of the error signal (e.g., difference between the desired and the actual signal). For example, the echo path is an unknown system that has a transfer function h(n) to be identified, and the AEC adaptive filter 214 attempts to adapt its transfer function ĥ(n) to make it as close as possible to the transfer function h(n) of the echo path.

Definition of Symbols of AEC Adaptive Filter

In this section, symbols used in the AEC adaptive filter 214 are defined, where: n is the number of the current input sample; p is the number of filter taps; x(n) is the echo reference signal from the far end (e.g., from other audio device 200 in the video-conferencing system 10), where $x(n)=[x(n), x(n-1), \ldots, x(n-p+1)]^T$; y(n) is the echo reference signal received by the microphone 250 through the echo path, where $y(n)=h^H(n) \cdot x(n)$; v(n) is the local speech signal (i.e., at the near end) plus the environment sound signal; d(n) is the acoustic signal generated by the microphone 250, where d(n)=y(n)+v(n); ĥ(n) is the transfer function of the AEC adaptive filter 214; ŷ(n) is the output signal of the AEC adaptive filter and it can be regarded as the estimated echo signal, where $\hat{y}(n)=\hat{h}^H \cdot x(n)$; e(n) is the residual echo signal or the error signal, where $e(n)=d(n)-y(n)=d(n)-h^H \cdot x(n)$.

Specifically, the echo reference signal x(n) is a matrix of the current input sample (i.e., at time n) and (p−1) previous input samples (i.e., at time=n−1, n−2, . . . , n−p+1) from the far end, such as other audio device 200 in the video-conferencing system 10. The AEC adaptive filter 214 may calculate the inner product of the Hermitian transpose of the transfer function ĥ(n) and the echo reference signal x(n) to obtain an output signal ŷ(n). The subtracter 216 may subtract the output signal ŷ(n) from the acoustic signal d(n) to obtain a residual echo signal e(n) that is sent to the far end (e.g., other audio devices 200 in the video-conferencing system 10).

In some embodiments, the transfer function $\hat{h}(n)$ of the AEC adaptive filter 214 may be regarded as a matrix of filter coefficients of the AEC adaptive filter 214. In addition, the residual echo signal e(n) is fed back to the AEC adaptive filter 214. If the residual echo signal e(n) is large, the AEC adaptive filter 214 may adjust its filter coefficients significantly so as to fit the transfer function h(n) of the echo path. If the residual echo signal e(n) is small, it may indicate that the currently used filter coefficients of the AEC adaptive filter 214 is close to the transfer function h(n) of the echo path, and the AEC adaptive filter 214 may adjust its filter coefficients slightly to fit the transfer function h(n) of the echo path.

In some embodiments, the AEC adaptive filter 214 may calculate its transfer function at time n+1, where $$\hat{h}(n+1) = \hat{h}(n) + \frac{\mu e^*(n)x(n)}{x^H(n)x(n)}.$$

In some other embodiments, the AEC adaptive filter 214 may calculate its transfer function at time n+1, where $\hat{h}(n+1)=\hat{h}(n)+\mu e^*(n)\times(n)$. Thus, the AEC adaptive filter 214 can compare the transfer functions (i.e., filter coefficients) at time n+1 and time n so as to determine whether to adjust its filter coefficients to fit the transfer function h(n) of the echo path.

Specifically, as described in the aforementioned embodiments, given that the positions of the loudspeaker 240 and microphone 250 are fixed, the distance between the loudspeaker 240 and microphone 250 is also fixed. In this case, if both the loudspeaker 240 and microphone 250 are turned on and work normally, the echo path may be quite stable. As a result, the filter coefficients of the AEC adaptive filter 214 will converge, and it indicates that the residual echo signal e(n) may be very close to 0. In addition, if a smartphone is used as the audio device 200, it is inherent that the positions of the loudspeaker 240 and microphone 250 are fixed and the distance between the loudspeaker 240 and microphone 250 is fixed. Thus, if both the loudspeaker 240 and microphone 250 are turned on and work normally, the filter coefficients of the AEC adaptive filter 214 may converge and be close to reference filter coefficients that were previously tested and calibrated in the factory.

However, if the loudspeaker 240 or the microphone 250 is turned off or does not work normally, the echo path may be invalid. For example, given that the microphone 250 works normally and the loudspeaker 240 is turned off or does not work normally, the microphone 250 will not receive the echo reference signal emitted from the loudspeaker 240. Meanwhile, the AEC adaptive filter 214 still generates the output signal ŷ(n) using the echo reference signal x(n). Since the component y(n) is absent in the acoustic signal d(n), the difference between the acoustic signal d(n) and the output signal ŷ(n), which is regarded as the residual echo signal e(n) will be large. As a result, the AEC adaptive filter 214 may erroneously estimate the transfer function (i.e., matrix of filter coefficients) of the echo path, and it will cause the estimated filter coefficients to diverge.

In another case, given that the loudspeaker 240 works normally and the microphone 250 is turned off or does not work normally, the loudspeaker 240 may emit the echo reference signal x(n), but the microphone 250 will not receive any acoustic signal. As a result, the acoustic signal d (n) is approximately close to 0. Meanwhile, the AEC adaptive filter 214 still generates the output signal ŷ(n) using the echo reference signal x(n). Since the acoustic signal d(n) is approximately close to 0, the difference between the acoustic signal d (n) and the output signal ŷ(n), which is regarded as the residual echo signal e(n) will be large. As a result, the AEC adaptive filter 214 may erroneously estimate the transfer function (i.e., matrix of filter coefficients) of the echo path, and it will cause the estimated filter coefficients to diverge.

In some embodiments, the reference filter coefficients for use in the AEC adaptive filter 214 may be generated in the manufacturing process for the audio device 200 with fixed locations of loudspeakers 240 and microphones 250 (e.g., a smartphone, laptop computer, tablet PC, desktop audio device, etc.). For example, during the manufacturing process in the factory, white noise or sweeping tone can be played on the audio device 200, and the processing circuitry 210 of the audio device 200 may perform the AEC process simultaneously. Thus, the reference filter coefficients for the AEC adaptive filter 214 can be obtained after performing the AEC process for a predetermined period of time, and the obtained reference filter coefficients can be stored in a non-volatile memory of the audio device 200.

In some other embodiments, the reference filter coefficient for use in the AEC adaptive filter 214 may be calculated at runtime. For example, during the audio conference, the processing circuitry 210 of the audio device 200 may automatically run the AEC process to obtain the reference filter coefficients for the AEC adaptive filter 214. For example, the user environment may be different from the test environment in the factory, and thus the echo path and interference in the user environment may be different from those in the factory. Thus, the processing circuitry 210 may automatically run the AEC process to obtain the reference filter coefficients in response to detecting that the audio device 200 is being used in an audio conference or a video conference. The processing circuitry 210 may first set the initial filter coefficients $\hat{h}(0)$=zeros(p), and it may calculate the runtime filter coefficients for the AEC adaptive filter 214 by calculating the average of the adaptive filter coefficients within a predetermined period of time when the loudspeaker 240 and microphone 250 are working normally.

In some other embodiments, the nonvolatile memory of the audio device 200 may store preset reference filter coefficients that have been tested and calibrated in the factory. However, the preset reference filter coefficients may be not suitable for the user environment in some cases. When the audio device 200 is turned on, the processing circuitry 210 may load the preset reference filter coefficients from the nonvolatile memory as the initial filter coefficients for the AEC adaptive filter 214. The processing circuitry 210 may then perform the AEC process and determine whether the preset reference filter coefficients are suitable for the user environment. For example, the processing circuitry 210 may determine whether the residual echo signal e(n) is smaller than a preset threshold to keep the updated filter coefficients converge for a predetermined period of time upon detecting that the audio device 200 is being used in an audio conference or a video conference. If the residual echo signal e(n) is smaller than the preset threshold for the predetermined period of time, the processing circuitry 210 may use the preset reference filter coefficients as the initial filter coefficients of the AEC adaptive filter 214. If the residual echo signal e(n) is not smaller than the preset threshold for the predetermined period of time, the processing circuitry 210 may initialize the filter coefficients $\hat{h}(0)$=zeros(p), that is, all components in the matrix are zeros. Thus, the AEC adaptive filter 214 may refine the filter coefficients at runtime.

Figure 4:
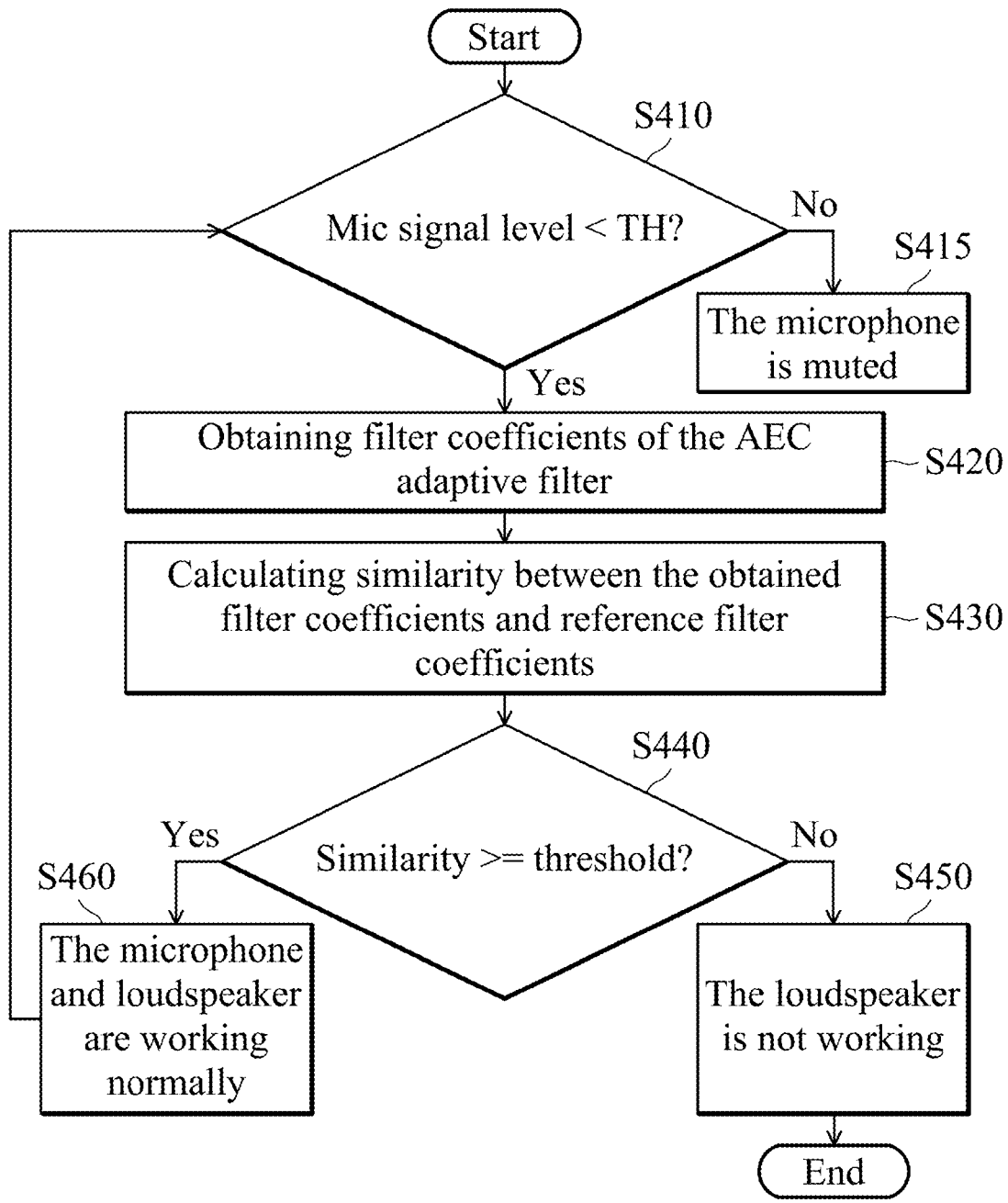
FIG. 4 is a flow chart of a method for detecting a device status of an audio device in an audio/video conference in accordance with an embodiment of the invention.

FIG. 4 is a flow chart of a method for detecting a device status of an audio device in an audio/video conference in accordance with an embodiment of the invention. Please refer to FIG. 2 and FIG. 4.

In step S410, it is determined whether the signal level of the microphone 250 is higher than a threshold. If it is determined that the signal level of the microphone 250 is higher than the threshold, step S420 is performed. If it is determined that the signal level of the microphone 250 is not higher than the threshold, it indicates that the microphone 250 is muted (step S415), and the flow ends. Meanwhile, the audio device 200 or the video device 100 at the local end may transmit an indication signal to the cloud network 20 so as to inform the audio devices 200 or video-conferencing apparatuses 100 at the far end that the microphone 250 of the local user is muted, such as showing an icon of a muted microphone on the graphical user interface of the video-conferencing application running on each video device 100 in the video-conferencing system 10.

In step S420, the filter coefficients of the AEC adaptive filter 214 are obtained. For example, the AEC adaptive filter 214 may update its filter coefficients at runtime, and the processing circuitry 210 may repeatedly obtain the filter coefficients of the AEC adaptive filter 214 every predetermined period of time.

In step S430, the similarity between the obtained filter coefficients and a plurality of reference filter coefficients are calculated. For example, the processing circuitry 210 may calculate cosine similarity between the obtained filter coefficients and the reference filter coefficients. For example, the cosine similarity between two vectors a and b can be expressed using equation (1):

$$\cos sim(a, b) = \cos\theta = \frac{\vec{a} \cdot \vec{b}}{\|\vec{a}\| \cdot \|\vec{b}\|} \quad (1)$$

Given the obtained filter coefficients $h_{adapt}$ and the reference coefficients $h_{ref}$, the similarity AdaptSim between the obtained filter coefficients $h_{adapt}$ and the reference coefficients $h_{ref}$ can be expressed using equation (2):

$$\text{AdaptSim} = \cos sim(h_{adapt}, h_{ref}) \quad (2)$$

In step S440, it is determined whether the similarity is greater than or equal to a preset threshold. If it is determined that the similarity is less than the preset threshold, it indicates that the loudspeaker 240 is not working (step S450), and the flow ends. If it is determined that the similarity is greater than or equal to the preset threshold, it indicates that the loudspeaker 240 and microphone 250 are working normally (step S460), and the flow goes back to step S410.

Specifically, steps S415, S450, and S460 in FIG. 4 may represent different device statuses of the audio device 200 during the audio or video conference. The processing circuitry 210 of the audio device 200 of the local end may transmit a status signal to the cloud network 20 to indicate the current device status of the audio device 200, and the cloud network 20 may forward the status signal to each video device 100 in the video-conferencing system 10. Thus, each video device 100 in the video-conferencing system 10 may show a status icon of the audio device 200 of user A on the graphical user interface of the video-conferencing application running on each video device 100. If user A is speaking during the video conference, user A can know whether users B and C can hear what he or she is saying from the graphical user interface. For example, if the flow in FIG. 4 proceeds to step S415, the device status of the audio device 200 indicates that the microphone 250 is muted. If the flow in FIG. 4 proceeds to step S450, the device status of the audio device 200 indicates that the loudspeaker 240 is not working. If the flow in FIG. 4 proceeds to step S460, the device status of the audio device 200 indicates that the loudspeaker 240 and microphone 250 are working normally. In brief, during the audio or video conference, the processing circuitry 210 may repeatedly determine a first status of the loudspeaker 240 according to a relation between the played echo reference signal and the received acoustic signal, and transmit the first status signal indicating the first status of the loudspeaker 240 to the far end through the cloud network 20. For example, the relation between the played echo reference signal and the received acoustic signal may be represented using filter coefficients and reference filter coefficients of the AEC adaptive filter. In some other embodiments, the relation between the played echo reference signal and the received acoustic signal may be represented using some other coefficients determined from the played echo reference signal and the received acoustic signal.

Figure 5A:
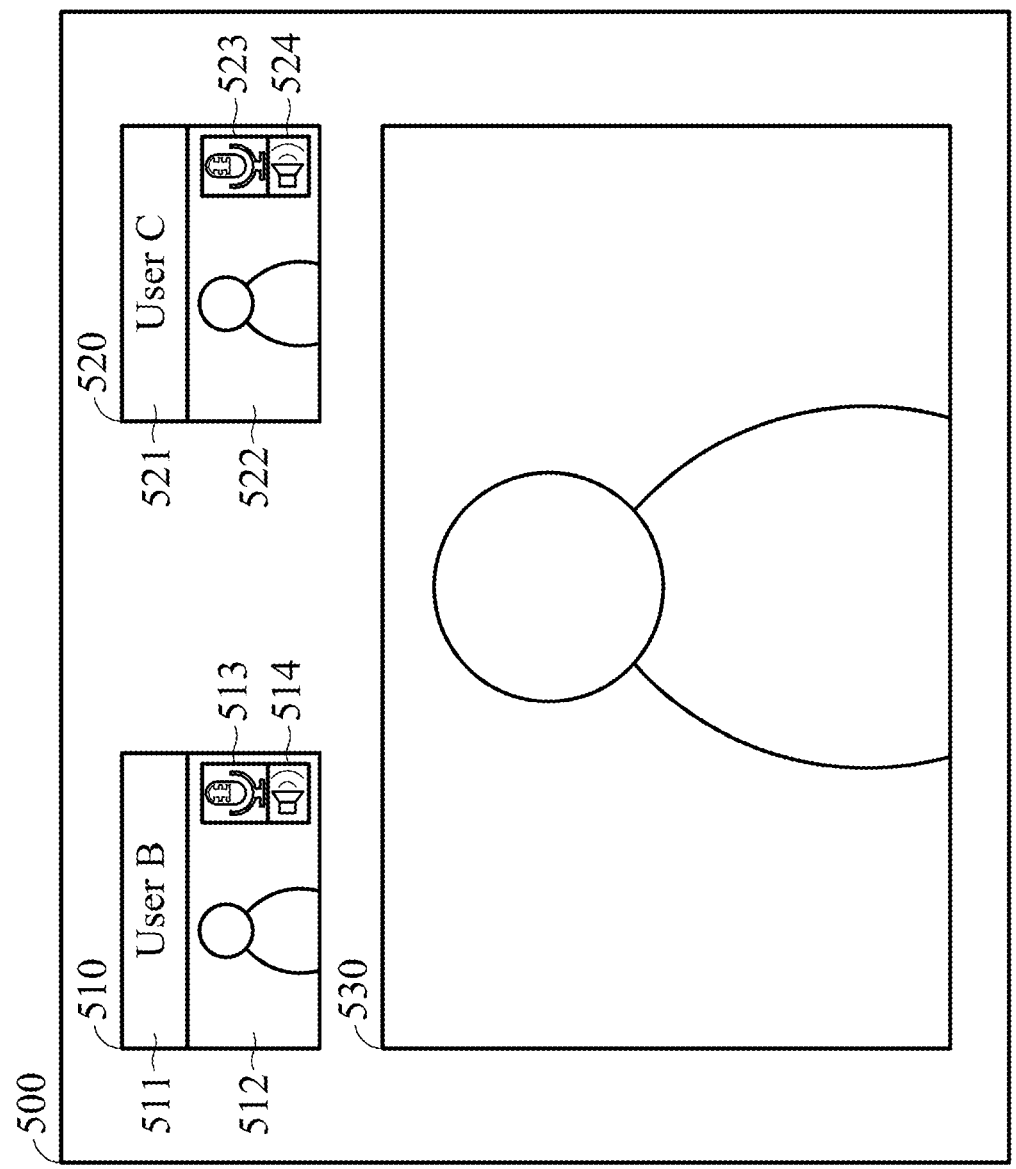
FIGS. 5A-5B are diagrams showing the graphical user interface with icons of different device statuses of the audio device in accordance with an embodiment of the invention.
Figure 5B:
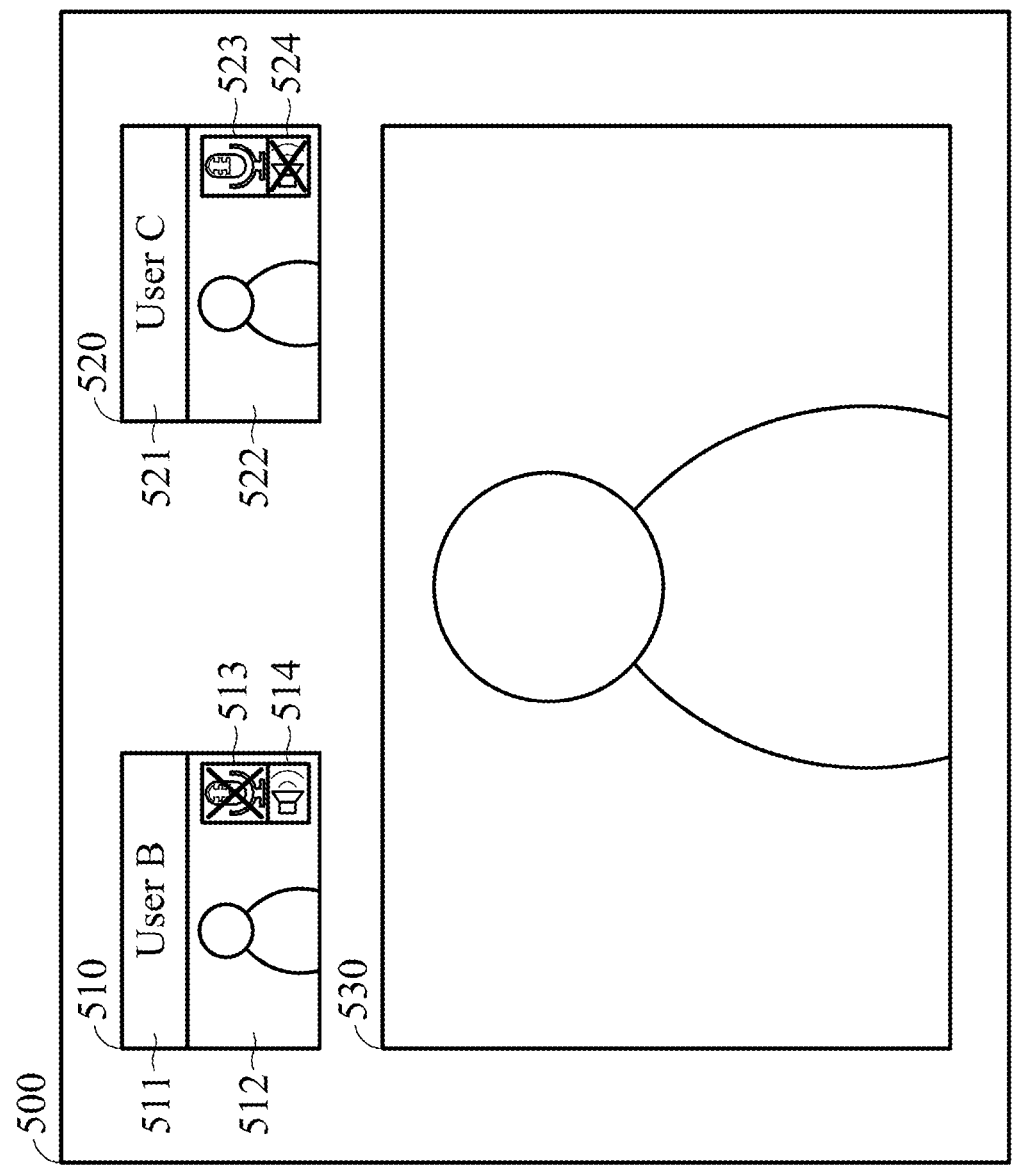

FIGS. 5A-5B are diagrams showing the graphical user interface with icons of different device statuses of the audio device in accordance with an embodiment of the invention. Please refer to FIG. 2, FIG. 4, and FIGS. 5A-5B.

Assuming that users A, B, and C join a video conference, the video device 100 of user A may show a graphical user interface 500 that includes blocks 510, 520, and 530, as shown in FIG. 5A. For example, block 510 may contain the username 511 (e.g., user B), video screen 512, and blocks 513 and 514 of the audio device 200 of user B, where block 513 shows the status of the microphone 250 of the audio device 200 of user B, and block 514 shows the status of the loudspeaker 240 of the audio device 200 of user B. Block 520 may contain the username 521 (e.g., user C), video screen 522, and blocks 523 and 524 of the audio device 200 of user C, where block 523 shows the status of the microphone 250 of the audio device 200 of user C, and block 524 shows the status of the loudspeaker 240 of the audio device 200 of user C. Block 530 may show the video screen of user A (i.e., the local user).

In FIG. 5A, it is assumed that the loudspeakers 240 and microphones 250 of the audio devices 200 of users B and C are working normally, and thus blocks 513 and 523 may show a microphone pattern with a specific color (e.g., green), and the loudspeaker-status icons 514 and 524 may show a loudspeaker pattern with a specific color (e.g., green). Accordingly, user A can know that the loudspeakers 240 and microphones 250 of the audio devices 200 of users B and C are working normally via the microphone-status icons 513 and 523 and the loudspeaker-status icons 514 and 524.

Referring to FIG. 5B, if the audio device 200 of user B detects that the signal level of its microphone 250 is below the threshold, the audio device 200 of user B may send the first status signal of user B indicating that the microphone 250 is muted to the cloud network 20, and the audio device 200 of user A can receive the status signal from the cloud network 20. Thus, the video-conferencing application running on the video device 100 of user A may show a microphone pattern covered with a red-color X mark on block 513. Meanwhile, the audio device 200 of user B may determine that its loudspeaker 240 is working normally, and send the second status signal of user B indicating that the loudspeaker 240 is working normally to the cloud network 20. Thus, the audio device 200 of user A can receive the second status signal from the cloud network 20, and the video-conferencing application running on the video device 100 of user A may show a loudspeaker pattern in green color.

In addition, if the audio device 200 of user C detects that its loudspeaker 240 is not working using the flow described in FIG. 4, the audio device 200 of user C may send the second status signal of user C indicating that the loudspeaker 240 is not working to the cloud network 20, and the audio device 200 of user A can receive the second status signal of user C from the cloud network 20, and the video-conferencing application running on the video device 100 of user A may show a loudspeaker pattern covered with a cross in red color. Meanwhile, if the audio device 200 of user C detects that the signal level of its microphone 250 is higher than the threshold, the audio device 200 of user C may determine that its microphone 250 works normally, and send the first status signal indicating that the microphone 250 is working normally to the cloud network 20. Thus, the audio device 200 of user A can receive the first status signal of user C from the cloud network, and the video-conferencing application running on the video device 100 of user A may show a loudspeaker pattern covered with a cross in red color.

Specifically, when user A is speaking during the audio conference, user A can view the icons in blocks 513-514 and 523-524 on the graphical user interface to know whether users B and C can hear what he or she said. Because the AEC process is a recursive finite-impulse response (FIR) filter, if any problem happens to the echo path or the AEC loop at certain time during the audio conference, the processing circuitry 210 of audio device 200 at the far end (e.g., audio devices of users B and C) may determine that its loudspeaker 240 and/or microphone 250 are not working, and the video device 100 of the local user (e.g., user A) can know the device status of the audio device 200 at the far end by viewing the icons in the corresponding blocks of the graphical user interface. Thus, the local user (e.g., user A) needs not to ask the question "did you hear me?" during the audio or video conference.

In view of the above, an audio device and a method of detecting a device status during an audio/video conference are provided, which are capable of detecting whether the loudspeaker or microphone of the audio device at the local end are working normally, and then providing the detected device status of the loudspeaker and microphone to other audio devices or video devices in the video-conferencing system. Accordingly, the user at the far end can know the device status of the loudspeaker and microphone of the audio device at the local end as well as the user at the local end can also know the device status of the loudspeaker and microphone of the audio device at the far end, thereby improving user experience during the audio or video conference.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An audio device, comprising:
processing circuitry, connected to a loudspeaker and a microphone, wherein the processing circuitry is configured to play an echo reference signal from a far end on the loudspeaker, and perform an acoustic echo cancellation (AEC) process using the echo reference signal and an acoustic signal received by the microphone using an AEC adaptive filter,
wherein the processing circuitry repeatedly determines a first status of the loudspeaker according to a relation between the played echo reference signal and the received acoustic signal, and transmits a first status signal indicating the first status of the loudspeaker to the far end through a cloud network.

2. The audio device as claimed in claim 1, wherein the relation between the played echo reference signal and the received acoustic signal is represented using a plurality of filter coefficients and a plurality of reference filter coefficients of the AEC adaptive filter.

3. The audio device as claimed in claim 2, wherein in response to the processing circuitry determining that a signal level of the microphone is lower than or equal to a threshold, the processing circuitry determines that the microphone is muted,
wherein in response to the processing circuitry determining that the signal level of the microphone is higher than the threshold, the processing circuitry determines a second status of the microphone is that the microphone is working normally, sends a second status signal indicating the second status of the microphone to the far end through the cloud network, obtains the filter coefficients from the AEC adaptive filter, and calculates similarity between the obtained filter coefficients and the reference filter coefficients.

4. The audio device as claimed in claim 3, wherein in response to the processing circuitry determining that the calculated similarity is lower than a preset threshold, the processing circuitry determines that the first status of the loudspeaker is that the loudspeaker is not working,
wherein in response to the processing circuitry determining that the calculated similarity is higher than or equal to the preset threshold, the processing circuitry determines that the first status of the loudspeaker is that the loudspeaker is working normally.

5. The audio device as claimed in claim 2, wherein the reference filter coefficients are calculated using the AEC adaptive filter by playing white noise and sweeping tones on the loudspeaker for a first predetermined period of time, and the calculated reference filter coefficients are pre-stored in a nonvolatile memory of the audio device during a process of manufacturing the audio device in a factory.

6. The audio device as claimed in claim 2, wherein the processing circuitry initializes the filter coefficients of the AEC adaptive filter to zero, and obtains the filter coefficients from the AEC adaptive filter at runtime as the reference filter coefficients by calculating an average of the filter coefficients of the AEC adaptive filter within a second predetermined period of time.

7. The audio device as claimed in claim 2, wherein the processing circuitry calculates cosine similarity between the filter coefficients and the reference filter coefficients as the similarity.

8. The audio device as claimed in claim 1, wherein the processing circuitry receives a third status signal and a fourth status signal respectively indicating a third status of a loudspeaker of another audio device and a fourth status of a microphone of said other audio device at the far end through the cloud network, and displays icons corresponding to the third status and the fourth status on a graphical user interface of a video-conferencing application running on a video device in which the audio device is disposed.

9. A method, for use in an audio device connected to a loudspeaker and a microphone, the method comprising:
- playing an echo reference signal from a far end on the loudspeaker;
- performing an acoustic echo cancellation (AEC) process on the echo reference signal and an acoustic signal received by the microphone using an AEC adaptive filter;
- determining a first status of the loudspeaker according to a relation between the played echo reference signal and the received acoustic signal; and
- transmitting a first status signal indicating the first status of the loudspeaker to the far end through a cloud network.

10. The method as claimed in claim 9, wherein the relation between the played echo reference signal and the received acoustic signal is represented using a plurality of filter coefficients and a plurality of reference filter coefficients of the AEC adaptive filter.

11. The method as claimed in claim 10, further comprising:
- in response to determining that a signal level of the microphone is lower than or equal to a threshold, determining that a second status of the microphone is that the microphone is muted; and
- in response to determining that the signal level of the microphone is higher than the threshold, performing the following steps:
  - determining that the second status of the microphone is that the microphone is working normally;
  - sending a second status signal indicating the second status of the microphone to the far end through the cloud network;
  - obtaining the filter coefficients from the AEC adaptive filter; and
  - calculating similarity between the obtained filter coefficients and the reference filter coefficients.

12. The method as claimed in claim 11, further comprising:
- in response to determining that the calculated similarity is lower than a preset threshold, determining that the first status of the loudspeaker is that the loudspeaker is not working; and
- in response to determining that the calculated similarity is higher than or equal to the preset threshold, determining that the first status of the loudspeaker is that the loudspeaker is working normally.

13. The method as claimed in claim 10, further comprising:
- calculating the reference filter coefficients using the AEC adaptive filter by playing white noise and sweeping tones on the loudspeaker for a first predetermined period of time; and
- pre-storing the calculated reference filter coefficients in a nonvolatile memory of the audio device during a process of manufacturing the audio device in a factory.

14. The method as claimed in claim 10, further comprising:
- initializing the filter coefficients of the AEC adaptive filter to zero; and
- obtaining the filter coefficients from the AEC adaptive filter at runtime as the reference filter coefficients by calculating an average of the filter coefficients of the AEC adaptive filter within a second predetermined period of time.

15. The method as claimed in claim 10, further comprising:
- calculating cosine similarity between the filter coefficients and the reference filter coefficients as the similarity.

16. The method as claimed in claim 9, further comprising:
- receiving a third status signal and a fourth status signal respectively indicating a third status of a loudspeaker of another audio device and a fourth status of a microphone of the another audio device at the far end through the cloud network; and
- displaying icons corresponding to the third status and the fourth status on a graphical user interface of a videoconferencing application running on a video device in which the audio device is disposed.

* * * * *